March 2, 1965    PAUL-LOUIS DE BOSREDON    3,171,557
TILTING DUMPING VEHICLE
Filed March 4, 1959    3 Sheets-Sheet 1
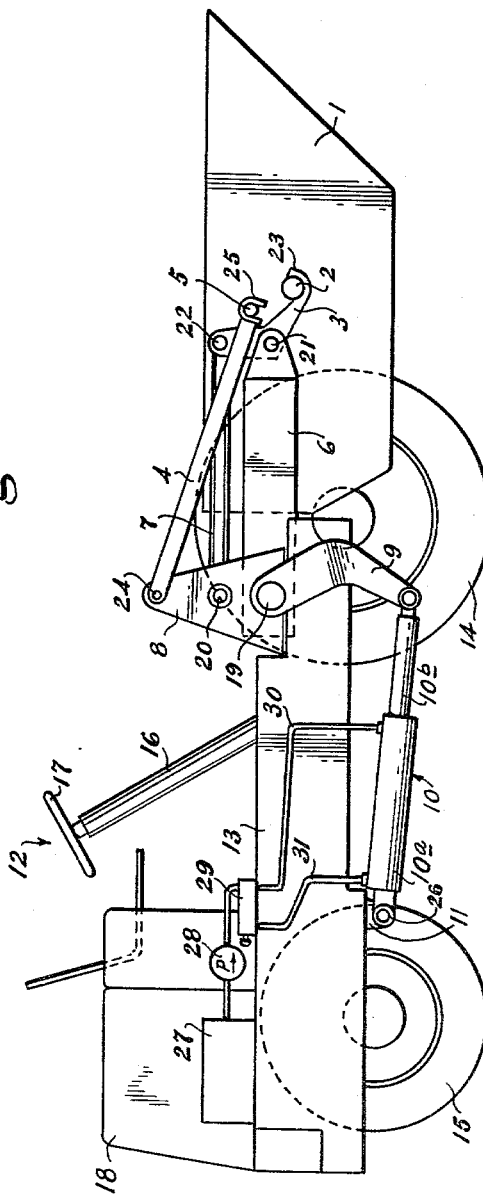
INVENTOR.
PAUL LOUIS DE BOSREDON
BY
ATTORNEY

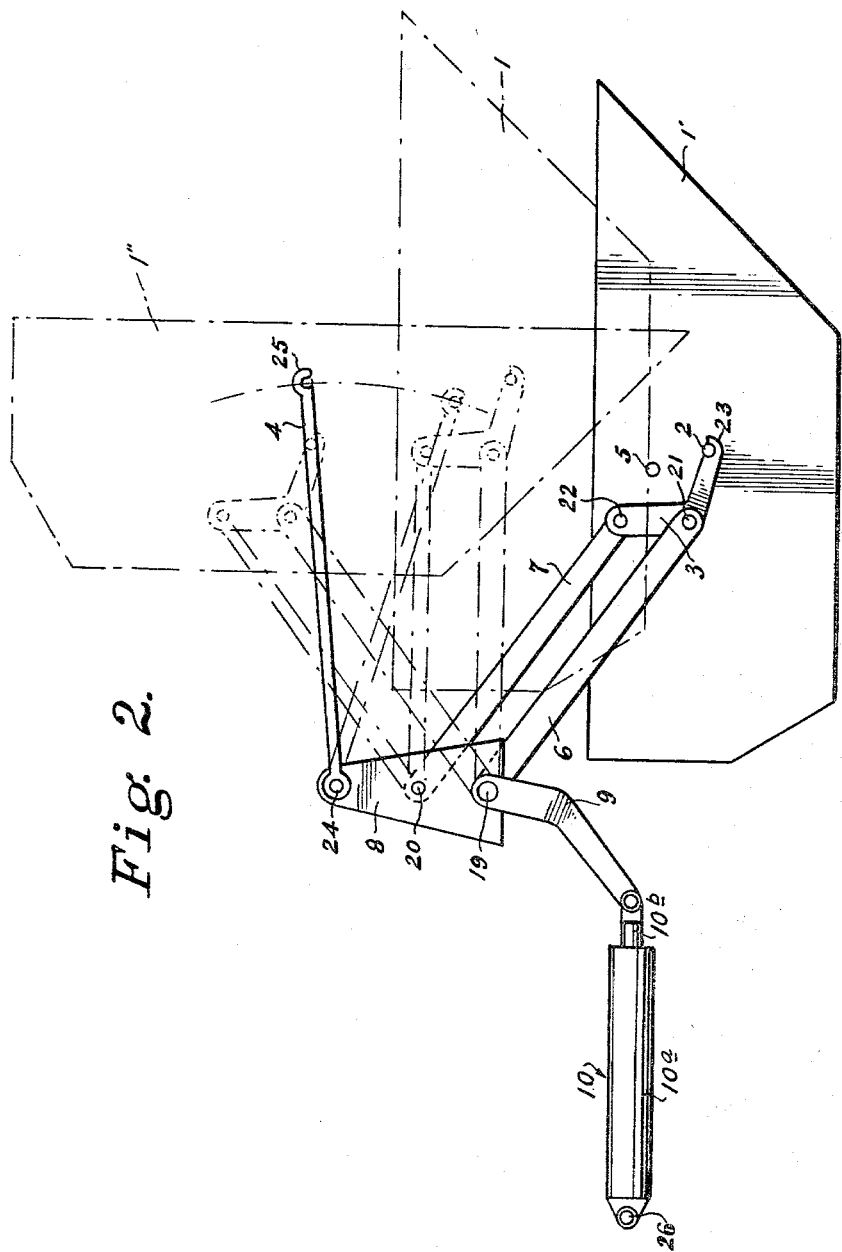

March 2, 1965 PAUL-LOUIS DE BOSREDON 3,171,557
TILTING DUMPING VEHICLE
Filed March 4, 1959 3 Sheets-Sheet 3
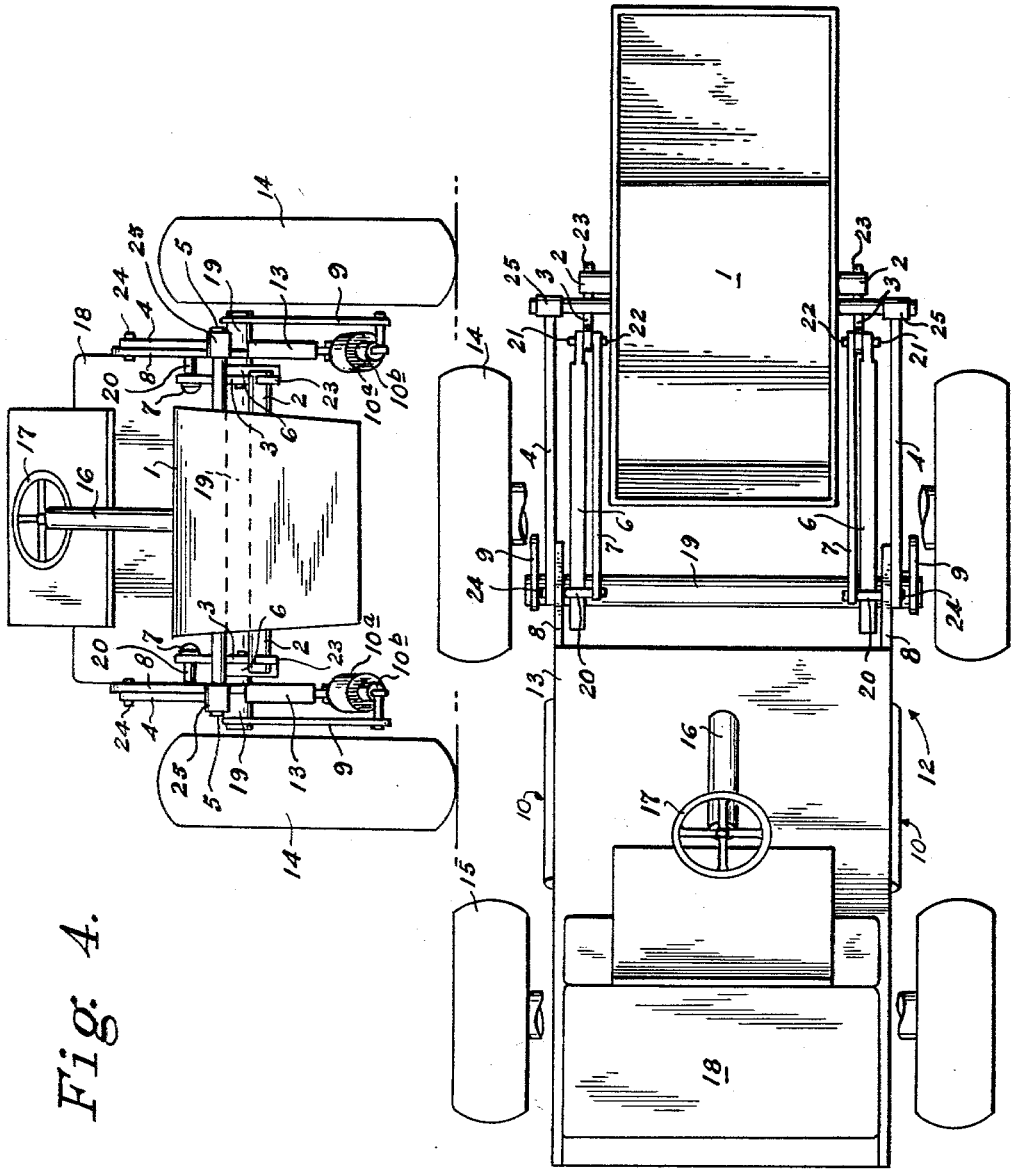
INVENTOR.
PAUL LOUIS DE BOSREDON
BY
ATTORNEY.

United States Patent Office 3,171,557
Patented Mar. 2, 1965

3,171,557
TILTING DUMPING VEHICLE
Paul-Louis de Bosredon, 59 Rue Beaumarchais,
Bergerac, France
Filed Mar. 4, 1959, Ser. No. 797,243
Claims priority, application France, Mar. 10, 1958,
Patent 1,200,800
3 Claims. (Cl. 214—313)

This invention relates to apparatus for handling loads in bulk, such as earth, fluid concrete mixes and concrete mix constituents, coal, ores, chemicals, and other comparable materials.

One conventional method of handling such materials uses tip-trucks running on narrow-gauge tracks. However, there are many instances where the installations of a narrow-gauge track network is inconvenient, and such a network requires rather extensive auxiliary equipment including switches, switchplates, shifting tracks, sidings and the like which demand substantial maintenance and corresponding manpower. There is a current trend, accordingly, in construction yards and other worksites, to replace such narrow-gauge railroads with travelling cranes mounted on road and off-the-road vehicles, e.g. half-tracks. This has greatly increased the speed of handling operations and reduced expenses in plant and manpower with a corresponding improvement in operating economy and efficiency. The loaded buckets are hoisted on the crane jib, then the loaded crane is driven to the desired unloading station and the bucket is tipped over to dump the load.

However bucket-handling operations when thus conducted are not entirely satisfactory. Cranes are not especially well-suited for the transportation of loads over long distances at high speeds. Considerable care must be exerted in seeing that the load in the bucket is well balanced to avoid inadvertent tipping of the bucket on the way. Loading and unloading operations are slow, delicate, and require specially trained personnel. An especially objectionable feature of cranes is their large vertical height which renders their use impractical in many cases where the work site is crowded with obstacles such as scaffolding, overhead lines, shed structures and the like, as well as indoors and in mines and other close or congested conditions.

It is an object of this invention to provide improved apparatus for handling loads, especially for handling bulk-loaded tip buckets. Another object is to provide such apparatus which will require a minimum amount of vertical clearance, and in which such clearance in fact will be determined not by the load handling means themselves, but actually by the vertical clearance of a conventional low vehicle, such as a tractor, truck or the like serving to transport the loaded bucket. A further object is to provide means for efficiently and rapidly loading, conveying and dumping heavily loaded buckets under any reasonable work-site conditions, and to provide such means in which the bucket will be firmly and stably held during all stages of loading and transportation without any possibility of premature dumping of the load and then positively and in a controlled manner tipping the bucket at a selected destination. It is another object to provide such means that can be readily adapted to any of the types of vehicles commonly used in public works, such as tractors, on- and off-the-road trucks, half-tracks, and others, as well as any type of conventional load container, with only a minimum amount of modifications required both to the vehicle and the container.

Briefly, according to one aspect of my invention I provide a pair of parallel linkages extending from the front of the frame of a vehicle, such as a tractor, and defining a pair of deformable parallelograms that are simultaneously deformable in laterally-spaced parallel vertical planes. From the free, forwardly extending end of each parallelogram there juts out an upwardly-concave cradle-like bearing surface. Power means such as an hydraulic jack are provided on the vehicle and connected with the parallel linkages for jointly deforming the corresponding parallelograms in their respective vertical planes. In order to take up and carry a loaded bucket positioned on the ground, the vehicle is suitably positioned in relation to the bucket and both parallel linkages are lowered so that their forwardly-jutting bearing surfaces engage under a pair of aligned trunnions projecting outwardly from the sides of the bucket. The power means are then operated to deform both parallel linkages upwardly, whereupon the bucket is raised, much after the manner of a man gripping the trunnions of the bucket in his upturned hands and then bending his forearms upwardly. Due to the parallel linkage action the bucket remains level during this raising movement. On reaching an elevated carrying position, locking arms having rear ends pivoted to the vehicle are rotated about their pivots so that downwardly concave bearing surfaces provided at the forward ends of the locking arms engage over locking pins provided on the sides of the buckets spaced above said trunnions. This positively locks the bucket in its carrying position, so that it can safely be transported at full speed of the carrier vehicle towards its destination without danger of premature dumping. To dump the bucket, the locking arms are retained in locking position and the power means is operated to deform the parallel linkages upwardly by a further amount. Due to the link now present between the locking pins and the vehicle by way of the locking arms, the bucket is now constrained to rotate bodily about the locking pins in a direction to dump the load. Thereafter the empty bucket can be eased back on to the ground by following a reverse procedure from that described.

An exemplary embodiment of the invention will now be described for purposes of illustration but not of limitation with reference to the accompanying drawings, wherein:

FIG. 1 is a somewhat simplified side elevational view of a novel tractor-and-bucket combination according to the invention, with the wheels at the side of the tractor facing towards the viewer being removed so as to expose the operating linkage for supporting the bucket on the tractor;

FIG. 2 is a diagrammatic showing of the bucket and operating linkage therefor in three principal operating positions, and with the shapes of the elements of the linkage being simplified as compared with FIG. 1, so as to avoid confusion between the lines representing the several operating positions;

FIG. 3 is a top plan view of the tractor and bucket combination of FIG. 1; and

FIG. 4 is a front elevational view of the tractor and bucket combination of FIG. 1.

There is illustrated in FIG. 1 a generally conventional tractor vehicle 12 including a frame 13 and front and rear wheels 14 and 15 supporting the frame at the opposite sides of the later. The tractor vehicle 12 further has the usual steering post 16 carrying a steering wheel 17 by which either the front or rear wheels are steered so as to guide the vehicle, and a motor housed within a hood 18 for driving the tractor vehicle. The tractor will not be further described since its construction is immaterial to the invention except for the specific features to be pointed out hereinafter. Coupled to the forward end of the tractor in a manner described in detail hereinafter is a bucket 1 which likewise may assume any convenient form, such as the conventional shape of a tipping bucket as illustrated.

Extending upwardly from the opposite sides of the tractor frame 13 at its forward end are fixed uprights 8 which may be formed integrally with the frame or secured thereto in any suitable way. A pivot 19 extends from each upright 8 near its base and pivotally supports the rear end of a forwardly projecting arm 6 of sturdy construction such as a steel channel element, and a second pivot 20 extends from each upright 8 at a point spaced upwardly from the pivot 19 and pivotally supports the rear end of a forwardly extending link 7. The forward ends of both the arm 6 and link 7, at each side of the tractor, are connected, by pivots 21 and 22, respectively, to spaced points of a cranked lever 3, the arrangement being such, as clearly shown in the drawing, that the four pivots 19, 20, 21 and 22 of arm 6 and link 7 lie at the respective apices of a deformable parallelogram. The crank lever 3 has a forwardly jutting lower arm which terminates in an upwardly-open part-cylindrical bearing surface 23. It will be apparent from FIGS. 3 and 4 that the assembly so far described including upright 8, arm 6, link 7, lever 3 and the related pivots is provided in duplicate on each side of the vehicle frame 13. The pivot 19 for each arm 6 is preferably in the form of a shaft extending transversely between uprights 8 and rotatably journalled in the latter.

From the side walls of the bucket 1 project the usual pair of trunnions 2 which are aligned and define an axis lying in the vertical plane containing the center of gravity of the bucket 1, but with such axis being disposed above the center of gravity. The trunnions 2 are adapted to be cradled in the open bearing surfaces 23 formed at the forward ends of the crank levers 3. Further, a pair of aligned pins such as 5 project outwardly from the sides of the buckets at points suitably positioned above the trunnions 2. Locking arms 4 have their rear ends mounted on pivots 24 at the top uprights 8 on the tractor and are formed, at their forward ends, with downwardly-open locking sockets 25 adapted to engage over the locking pins 5 at the respective sides of the bucket.

The arms 6 are rigidly secured to pivot shaft 19, and also rigidly secured to the ends of the latter are depending rocker arms 9, each of which has its lower end pivotally connected with the front end of a piston rod 10b forming part of a fluid-operated jack 10, the cylinder 10a of jack 10 is pivoted, as at 26, to a suitable bracket 11 fixed to the tractor frame 13. Each jack 10 is operated with pressure fluid, such as air or oil, from a conventional hydraulic control system that may include a reservoir 27 for hydraulic fluid, a pump 28 operated by the motor of the tractor and pumping fluid from reservoir 27 to a distributor valve 29 having conduits 30 and 31 extending to the opposite ends of cylinder 10a for selectively supplying hydraulic fluid to the forward and rear ends, respectively, thereby to retract and extend rod 10b.

The system described operates as follows:

Referring to FIG. 2 (wherein, for the sake of simplicity, the levers 3, arms 4 and 6 and links 7 are represented schematically), it is assumed that initially a loaded bucket is positioned on the ground, as shown in full lines at 1'. The tractor is driven to a suitable position to the rear of and in alignment with the bucket, and the jacks 10 are operated to each retract the piston rod 10b thereof, thereby turning the rocker arms 9 of clockwise (from the position in FIG. 1) and deforming the parallel linkages 3, 6, 7 and 8 until they have each assumed the position shown in full lines in FIG. 2. The sockets or bearing surfaces 23 at the jutting lower ends of crank levers 3 can now easily be engaged below the trunnions 2 of the bucket, as shown in the drawing. The jacks 10 are now operated to extend the piston rods 10b thereof and turn rockers 9 counterclockwise. The parallel linkages 3, 6, 7 and 8 are thus deformed to assume the intermediate condition shown in FIG. 2, similar to the condition in FIG. 1, and the bucket is moved to a corresponding elevated position as shown in FIG. 1. During this raising movement of the bucket from the ground to the elevated carrying position, the bucket 1 is substantially balanced about the trunnions 2 and the action of the parallelogram linkages is to maintain the bucket at all times lever or horizontal, as the parallel displacement of the crank levers 3 on deformation of the parallel linkages exerts no couple whatsoever on the trunnions 2 tending to tip the bucket, and the frictional engagement of the trunnions 2 with the bearing surfaces 23 is sufficient per se to ensure a stable smooth and level lifting motion.

When the bucket has reached its elevated position shown in FIG. 1, and at 1 in FIG. 2, the locking arms 4 are lowered, by clockwise rotation, into engagement with the pins 5. The bucket is now securely held regardless of the pressure condition in jacks 10 and forms a rigid unit with the carrier vehicle which can be driven from one place to another in any direction and regardless of any obstacles other than such as would impede the progress of the carrier vehicle itself. That is, the vertical and lateral clearances of the tractor-and-bucket assembly is determined only by the tractor or other carrier vehicle, not by the bucket or the coupling and operating means therefor.

When it is desired to dump the load, the jacks 10 are now actuated to extend their piston rods in full, and the parallel linkages 3, 6, 7 and 8 are thereby deformed to their uppermost position shown in FIG. 2. During this movement, the locking arms 4 are retained in engagement with the pins 5, so that the pins 5 are constrained to rotate about the fixed center defined by the pivots 24 of arms 4 on the uprights 8. In view of this eccentric rotation of the pins 5 with respect to the rotation of the arms 6 and the links 7 about pivots 19 and 20, respectively, it will be apparent that the bucket is now constrained to rotate clockwise to the position indicated at 1" in FIG. 2, and the relative dimensioning is made such that in the fully extended condition of the jacks 10 the bucket assumes a substantially vertical condition as shown.

It will be understood that various modifications other than those specifically mentioned herein may be provided within the scope of the invention as defined by the ensuing claims. Thus, the carrier vehicle may assume any desired form, for example, the invention may be applied to a platform truck. A common carrier vehicle, tractor, truck, or other type, may be fitted with means according to the invention for handling more than one bucket. The handling means of the invention may be obviously provided at the rear of the carrier vehicle rather than at the front as shown. The means for operating the parallel linkage may assume forms other than the fluid pressure jacks described, and may be powered from any convenient source of energy, such as a power take-off from the vehicle engine. Further, the operation of the locking arms 4 may be accomplished through any desired mechanical, hydraulic or pneumatic controls readily conceivable by those familiar with the art, rather than purely manually as described herein.

What I claim is:

1. A dump truck comprising a frame, a pair of parallel, laterally spaced supporting arms pivotally mounted, at one end, on said frame for joint swinging relative to the latter about a first horizontal axis, a pair of parallel locking arms pivotally mounted, at one end, on said frame for joint swinging relative to the latter about a second axis which is parallel to said first axis and spaced from the latter so that the free ends of said supporting arms and locking arms respectively move along different, non-concentric arcuate paths, a bucket shaped to fit between said pairs of supporting and locking arms and having an aligned pair of supporting trunnions projecting from its opposite sides, a lever pivoted intermediate its ends on the free end of each of said supporting arms, a link extending parallel to each supporting arm and having the same length as the latter, said link being pivotally connected, at its opposite ends, to said frame and to one end of said lever, respectively so that each supporting arm and the related link and lever respectively form two long sides and one end of a parallelogram that is deformable in response to swinging of the supporting arm, whereby the angular position of each of said levers is fixed during swinging of the related supporting arm, the other end of each of said levers having a socket thereon engageable with the trunnion extending from the adjacent side of the bucket to support the latter from said supporting arms, aligned locking pins projecting from said opposite sides of the bucket and being spaced from said trunnions, power means operative to swing said supporting arms between a lowered positioned where the sockets of said levers at the free ends of the supporting arms are engageable with said trunnions while the bucket rests on the ground, an intermediate elevated position where the bucket is raised from the ground for transport with said frame and a high elevated position, and means at the free ends of said locking arms engageable with said locking pins when the bucket is raised to said intermediate elevated position to prevent turning of the bucket about said trunnions and remaining in engagement with said locking pins during movement of said supporting arms to said high elevated position so that the nonconcentric arcuate paths of movement of the free ends of said supporting and locking arms cause said locking pins to move relative to said trunnions for tilting said bucket.

2. A dump truck as in claim 1; wherein said socket at the other end of each lever opens upwardly.

3. A dump truck as in claim 2; wherein said means at the free end of each locking arm is in the form of a downwardly opening socket.

References Cited by the Examiner
UNITED STATES PATENTS

| | | | |
|---|---|---|---|
| 477,702 | 6/92 | Rodenhausen | 298—11 |
| 515,987 | 3/94 | Bauers | 298—11 |
| 670,315 | 3/01 | Eynon | 298—5 |
| 1,155,739 | 10/15 | Kunkel | 298—11 |
| 1,622,201 | 3/27 | Little | 214—390 |
| 2,432,472 | 12/47 | Hastings | 298—11 |
| 2,494,377 | 1/50 | Cresci | 298—11 |
| 2,591,435 | 4/52 | Hunsaker et al. | 298—20 |
| 2,626,070 | 1/53 | Ezell et al. | 214—313 |
| 2,716,502 | 8/55 | Wilson | 214—313 |

FOREIGN PATENTS

| | | |
|---|---|---|
| 87,584 | 6/56 | Norway. |

EUGENE G. BOTZ, *Primary Examiner.*

LEO QUACKENBUSH, JAMES S. SHANK, *Examiners.*